United States Patent
Nakanishi et al.

[15] 3,668,210
[45] June 6, 1972

[54] 3-CHLORO DIHYDRODIBENZAZEPINE DERIVATIVES

[72] Inventors: Michio Nakanishi, Oita; Chiaki Tashiro, Fukuoka, both of Japan

[73] Assignee: Yoshitomi Pharmaceutical Industries, Ltd., Osaka, Japan

[22] Filed: Feb. 3, 1969

[21] Appl. No.: 796,163

[30] Foreign Application Priority Data

Feb. 7, 1968 Japan....................................43/7571

[52] U.S. Cl..................260/293.59, 260/239 D, 260/293.63, 260/293.86, 424/267
[51] Int. Cl.......................................................C07d 41/08
[58] Field of Search..............................................260/294 A

[56] References Cited

UNITED STATES PATENTS 3,313,810   4/1967   Nakanishi et al......................260/243
3,329,683   7/1967   Nakanishi et al......................260/293

*Primary Examiner*—Henry R. Jiles
*Assistant Examiner*—G. Thomas Todd
*Attorney*—Wenderoth, Lind & Ponack

[57]   ABSTRACT

New dibenzazepine derivatives of the formula

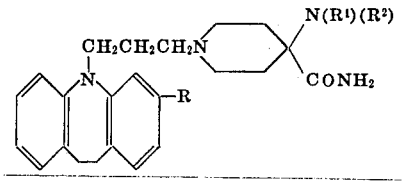

wherein R is Cl, $OCH_3$, $CH_3$, or $COCH_3$, and $-N(R^1)(R^2)$ is dimethylamino or piperidino, as well as pharmaceutically acceptable acid addition salts thereof, are useful as psychotropic agents.

5 Claims, No Drawings

3-CHLORO DIHYDRODIBENZAZEPINE DERIVATIVES

This invention relates to new dibenzazepine derivatives of the formula:

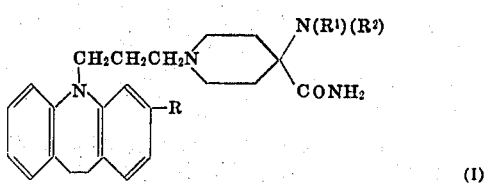

(I)

wherein R is Cl, $OCH_3$, $CH_3$ or $COCH_3$ and $-N(R^1)$ $(R^2)$ is dimethylamino or piperidino, and as well as pharmaceutically acceptable acid addition salts thereof.

The object of the present invention is to provide novel dibenzazepine derivatives of the above cited formula (I) or pharmaceutically acceptable acid addition salts thereof, which are useful, for example, as psychotropic agent. Pharmaceutical compositions are also provided.

Another object of the present invention is to provide a method of the production of the aforesaid novel and useful dibenzazepine derivatives.

The above-mentioned objects are realized (i) by reacting a compound of the formula:

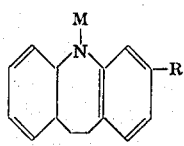

wherein M is H or alkali metal (e.g. Na) with a compound of the formula:

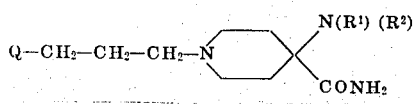

wherein Q is a reactive radical (e.g. a halogen, such as Cl, Br or I, or a reactive acid residue, such as methyl-sulfonyloxy, p-tolylsulfonyloxy), or (ii) by reacting a compound of the formula

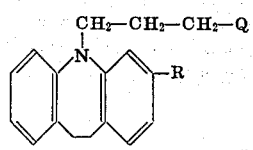

(Q being the same as above mentioned) with a compound of the formula

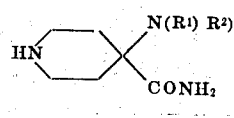

These reactions are carried out in a solvent, and are facilitated at an elevated temperature of about 50° to about 150° C, especially at about the boiling point of the solvent. Most suitable solvents for reaction (i) are aromatic hydrocarbons such as toluene and xylene, and for reaction (ii) alcohols such as ethanol. Any other suitable solvents such as methanol, propanol, isopropanol, butanol, acetone, methyl ethyl ketone, benzene, chlorobenzene, tetrahydrofuran, dioxane, dimethylformamide, dimethyl sulfoxide and liquid ammonia may also be used depending on the kinds of starting materials and reaction conditions. Acid acceptors such as alkali amides, alkali hydroxides, alkali carbonates and amines (e.g. triethylamine, pyridine) may be used. An excess of the starting piperidine compound may also serve as an acid acceptor.

Thus-produced dibenzazepine derivatives represented by the formula (I) can form pharmaceutically acceptable acid addition salts with various inorganic and organic acids such as hydrochloric, hydrobromic, nitric, phosphoric, sulfuric, sulfamic, oxalic, maleic, fumaric, succinic, citric, tartaric, salicylic, methanesulfonic, o-(p-hydroxybenzoyl)benzoic acid and so on.

Dibenzazepine derivatives represented by the formula (I) as well as their pharmaceutically acceptable acid addition salts, are useful as psychotropic agents. For example, in schizophrenia, the compounds of the present invention improve lack of rapport, deficiency of initiative and autism, and alleviate depressive state. The following animal tests were carried out in an attempt to compare the pharmacological actions of 3-chloro-5-(3-(4-carbamoyl-4-piperidino-piperidino)propyl)-10,11-dihydro5H-dibenz(b,f)azepine di(hydrogen maleate) (hereinafter called Y-4153) with those of N-(3-(4-carbamoyl-4-piperidinopiperidino)propyl)-10,11-dihydro-5H-dibenz(b,f)azepine dihydrochloride monohydrate (called Carpipramine) and N(3-dimethylaminopropyl)-10,11-dihydro-5H-dibenz(b,f)azepine hydrochloride (called imipramine).

Effect on locomotor activity

The effect was tested by the method of P.B. Dews (Brit. J. Pharmacol. 8 46, 1953). Groups each of five male mice, dd strain weighing 20 to 25 g., were kept in compartments to count their locomotor activity for 20 minutes. The test compound had been administered intraperitoneally 40 minutes before the test. The locomotor counts of control groups in 20 minutes were $247 \pm 51$ (mean ± standard deviation). The dose necessary to reduce the locomotor counts to 100 is expressed as $ED_{100}$.

| | $ED_{100}$(dose mg./Kg.) |
|---|---|
| Y—4153 | 2.5–5 |
| Carpipramine | 2.5 |
| Imipramine | ≈ 20 |

Effect on the suppression of fighting behavior

Fighting episodes were produced in mice by the method of Tedeschi et al (J. Pharm. Exptl. Therap., 125, 28, 1959). Groups each of six (three pairs) dd-strain male mice, weighing 20 to 25g., were kept in an apparatus consisting of a grid floor, and were delivered an electrical stimulation of rectangular current of 1.3 milliamperes, 530 volts, 10 cycles per second stimulus intensity (for 3 minutes).

Pairs of mice treated with the test compound exhibiting 3 fighting episodes or less within 3 minutes of footshock were designated as negative responders.

The $ED_{50}$ was calculated from the means of the inhibitory rate obtained hourly for 5 hours after the oral administration of the test compound.

The control mice of 81 pairs had the fighting episodes of 8.7 times on the average under the same condition.

| | $ED_{50}$ (dose.mg/Kg.body weight) |
|---|---|
| Y—4153 | 40–80 |
| Carpipramine | 160 |
| Imipramine | 80–160 |

Antihistamine effect

Male guinea pigs, weighing 400 to 600g., were used after 18 hours of fasting. The animal was killed by the blow on the neck to isolate their ileum.

The isolated ileum was suspended in 10 ml. (tissue) bath containing Tyrode's solution at 37° C, gassed with air and contractions of the ileum induced by cumulative dose of histamine were recorded on kymograph with an isotonic frontal-writing lever.

The test compound was administered preliminarily for 3 minutes before the agonist. $pA_2$ and $pD'_2$ values of the test compound was calculated by the method of J.M. van Rossum. (Arch. interm. Pharmacodyn., 143, 299, 1963).

|  | $pA_2$ | $pD'_2$ |
|---|---|---|
| Y—4153 | — | 5.8 |
| Carpipramine | — | 5.3 |
| Imipramine | 7.2 | 5.2 |

Acute toxicity

The test compound was administered (intravenously (i.v.), intraperitoneally(i.p.), subcutaneously(s.c.) and orally (p.o.) to dd-strain mice and Wistar strain rats, weighing 20 to 25g. and 100 to 130g., respectively. The $LD_{50}$ and fiducial limit ($p=0.05$) were calculated from the lethality within 7 days by Litchfield-Wilcoxon's method. (J. Phrmacol. and Exp.Therap.96 99, 1949).

$LD_{50}$ fiducial limit($p=0.05$)   dose.mg/Kg.body weight)

|  |  | Y—4153 | Carpipramine |
|---|---|---|---|
|  | i.v. | 18(16.2–20.0) | 16(14.5–17.6) |
| mice | i.p. | 87(65.0–116.5) | 136(100–185) |
|  | p.o. | >2000 | >2000 |
|  | i.p. | 125(92–170) | 76(64–91) |
| rat | s.c. | >2000 | >2000 |
|  | p.o. | 6800(4860–9500) | 1025(814–1282) |

Deconditioning effect

Test compounds were administered to Wistar strain rats weighing about 150g. and *conditioned stimulus was delivered 4 times for 90 seconds each 1,2,3 and 5 hour's later. $ED_{50}$ was calculated from the average inhibitory rate.
* conditioned stimulus; a buzzer
  unconditioned stimulus: direct current, 28V, 1.6mA.

| Dose mg/Kg.(i.p.) | inhibitory rate (%) | | | |
|---|---|---|---|---|
|  | Y—4153 | Carpipramine | Chlorpromazine | Imipramine |
| 10 |  |  |  |  |
| 20 | 26 | 11 | 100 |  |
| 40 | 70 | 40 |  | 4.6 |
| $ED_{50}$ | 29 | >40 | 2.8 | >40 |

Y-4153 showed deconditioning effect about 1/10 as potent as that of Chlorpromazine (N-(3-dimethylaminopropyl)-3-chlorophenothiazine hydrochloride).

Antiapomorphine effect in rats

Dose 1)
Appearing rate of gnawing reflex rats mg/Kg.(p.o.)
against test rats

| | Y—4153 | Carpipramine | TF Chlorpromazine | Imipramine |
|---|---|---|---|---|
| 5 |  |  |  | 5/10 |
| 10 |  |  |  | 1/10 |
| 20 | 10/10 | 10/10 | 0/10 |  |
| 40 | 10/10 | 10/10 |  | 10/10 |
| $ED_{50}$ dose mg/Kg. body weight | >40 | >40 | Ca. 5 | >40 |

1. The test compound was administered 60 minutes before the use of apomorphine.(1.25mg/Kg.(i.v.)). $ED_{50}$ was calculated from the average inhibitory rate of the appearing rate of gnawing reflex which was observed 5 and 20 minutes, respectively after the oral administration of apomorphine against groups each of 5 male rats of Wistar strain weighing about 200g. Y-4153 as well as Carpipramine and Imipramine did not show antiapomorphine effect in rats.

Influence on pressor effects.
amines used:
Noradrenaline(N.A.) Adrenaline(Ad.), Acetylcholine (Ach.) and Histamine (His.).

The influence of the test compounds upon pressor effects of amines was examined 15 minutes after administration of 5mg. of test compounds per Kg. of eight rabbits weighing 3 to 4 Kg. and was shown as minus changing rate of pressor in comparison with that of rabbits before administration.

|  | Number of Animals | Changing rate (%) | | | |
|---|---|---|---|---|---|
|  |  | N.A. | Ad. | Ach. | His. |
| Y—4153 | 2 | −75.6 | −86.0 | −11.0 | −22 |
| Carpipramine | 3 | −69.8 | −57.0 | −10.3 | −25** |

*: The inhibiting effect was observed only in one case and two other cases showed slightly increased effect.
**: The inhibiting effect was observed only in two cases and one other case showed increased effect.

Observation of symptoms
test animals: Groups each of dd strain male mice weighing 20 to 25g. were tested.

(Y—4153)
Dose mg/Kg.p.o.   Symptoms

| 10 | Hardly changed. |
|---|---|
| 40 | Slightly reduced locomotor activity about 60 minutes after administration. The activity recovered to normal after 24 hours. No remarkable abnormalities except the above. |
| 160 | Reduction of locomotor activity after 30 minutes and slight palpebral ptosis. Such sedative state continued more than 7 hours and returned to normal after 24 hours. |
| 640 | Obvious palpebral ptosis and reduced frequency of respiration after 10 minutes. Lowered body temperature, and about 3 hours after administration, disappeared pinnal reflex. Almost normal response to touching stimulus although slightly dull. |
| 1280 | Remarkable palpebral ptosis and reduction of frequency of respiration. After 60 to 120 minutes, disappeared locomotor activity with no or little sign of its recovery even by sound or touching stimulus. Slightly catatonic but no paralytic forced walk. After 15 to 18 hours, sedation in normal posture, lowering of body temperature and slight palpebral ptosis remained, but general symptoms almost recovered to normal. |

Carpipramine
Dose mg/Kg.p.o.   Symptoms

| 10 | Hardly changed |
|---|---|
| 160 | Only slight sedative effect |
| 640 | About 30 minutes after administration, palpebral ptosis, lowering of body temperature, and reduced frequency of respiration. Such symptoms slightly and almost normalized after 5 to 6 hours and 12 to 15 hours respectively. |

Thus, the compounds of the present invention have Carpipramine or imipramine-like effect to some extent but, they show a specific effect not observed in the latter two compounds.

The compound (I) of this invention and pharmaceutically acceptable acid addition salts thereof can be administered safely per se as psychotropic agent or in the form of a pharmaceutical composition in admixture with a suitable and per se conventional carrier or adjuvant, administrable orally without causing harm to the host.

The pharmaceutical composition can take the form of tablets, granules, powders, capsules, etc. for oral administration.

The choice of carrier is determined by the preferred form of administration, the solubility of the compounds and standard pharmaceutical practice. The following are examples of formulation when a compound of the present invention is administered for the pharmaceutical purposes.

(A) 25 mg. Capsule

| | |
|---|---|
| Y—4153 | 29.2582 mg. (equivalent to 25 mg. of the base) |
| lactose | 105.3418 |
| Metolose* | 0.4000 |
| carboxymethylcellulose (free acid) | 3.5000 |
| magnesium stearate | 1.5000 |
| | 140.000 mg. |

(B) 25 mg. Tablet

| | |
|---|---|
| Y—4153 | 29.2582mg.(equivalent to 25 mg. of the base) |
| microcrystalline cellulose | 10.0000 |
| starch | 20.6318 |
| lactose | 52.0000 |
| Metolose —25** | 2.1100 |
| magnesium stearate | 1.0000 |
| cellulose acetate phthalate | 0.2100 |
| powdered acacia | 2.5000 |
| precipitated calcium carbonate | 19.0000 |
| talc | 19.0000 |
| sucrose | 44.2680 |
| beewax | 0.0020 |
| carnauba wax | 0.0200 |
| total | 200,0000 mg. |

* product of the Shin-Etsu Chemical Industry Co., Ltd., a methylcellulose which is methylated at approximately two of the three hydroxyl groups of the glucose unit,
** a modified methylcellulose which in the main methylated and partly hydroxypropylated at two of the three hydroxyl groups of the glucose unit.

Usually daily dose of the compound (I) or salt thereof, lies in the range of about 50 to 700 milligrams, more practically about 75 to 300 milligrams per human adult. Thus, in case of capsules or tablets each containing 25 milligrams of compound (I) or salt thereof, three to twelve capsules or tablets per day are administered.

In the following illustrative examples, "g." stands for "gram(s)" and "ml." for "milliliter(s)".

EXAMPLE 1

A mixture of 5.0g. of 3-chloro-5-(3-chloropropyl)-10,11-dihydro-5H-dibenz(b,f)azepine, 5.0g. of 4-carbamoyl-4-piperidinopiperidine and 50 ml. of dimethylformamide is heated at 100° C for 10 hours. The solvent is distilled off. After the addition of a 2 percent sodium carbonate solution to the flask, the content is scratched to yield a semisolid, which is dissolved in 50 ml. of isopropanol. A solution of 5g. of maleic acid in 50 ml. of isopropanol is added, and the precipitate is collected by filtration and recrystallized from isopropanol to give 5.6g. of crystalline 3-chloro-5-(3-(4-carbamoyl-4-piperidino-piperidino)propyl)-10,11-dihydro-5H-dibenz(b,f)azepine di(hydrogen maleate)with 1/2 molecule of water of crystallization melting at 181° to 183° C.

EXAMPLE 2

By the procedure of Example 1, 6.8g. of 3-chloro-5-(3-chloropropyl)-10,11-dihydro-5H-dibenz(b,f)azepine is reacted with 6g. of 4-carbamoyl-4-dimethylamino-piperidine to give 4.8g. of crystalline 3-chloro-5-(3-(4-carbamoyl-4-dimethylaminopiperidinopropyl)-10,11-dihydro-5H-dibenz(b,f)azepine di(hydrogen maleate) melting at 145° to 150° C.

In the same manner as in Example 1, the following dibenzazepine derivatives are also produced.

3. 3-methoxy-5-(3-(4-carbamoyl-4-piperidinopiperidino)-propyl)-10,11-dihydro-5H-dibenz(b,f)azepine di(hydrogen maleate) melting at 186°C, 4. 3-acetyl-5-(3-(4-carbamoyl-4-piperidinopiperidino)-propyl)-10,11-dihydro-5H-dibenz(b,f)azepine dihydrochloride monohydrate melting at 240° to 245° C, and 5. 3-methyl-5-(3-(4-carbamoyl-4-piperidinopiperidino)-propyl)-10,11-dihydro-5H-dibenz(b,f)azepine dihydrochloride monohydrate melting at 260° to 263° C.

What is claimed is:

1. A compound of the formula

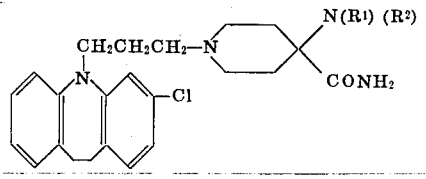

wherein —N($R^1$) ($R^2$) is a member selected from the group consisting of dimethylamino and piperidino.

2. A pharmaceutically acceptable acid addition salt of a compound as defined in claim 1.

3. A compound as claimed in claim 1, wherein the pharmaceutically acceptable addition salt is hydrogen maleate.

4. A compound according to claim 1, namely, 3-chloro-5-(3—(4-carbamoyl-4-piperidinopiperidino)propyl)-10,11-dihydro-5H-dibenz(b,f)azepine.

5. A compound according to claim 1, namely, 3-chloro-5-(3 δ(4-carbamoyl-4-dimethylaminopiperidino)propyl)-10,11-dihydro-5H-dibenz(b,f)azepine.

* * * * *